US006781809B2

(12) United States Patent
Milanczak

(10) Patent No.: US 6,781,809 B2
(45) Date of Patent: Aug. 24, 2004

(54) FUSED ELECTRICAL DISCONNECT DEVICE FOR HIGH CURRENT APPLICATIONS

(75) Inventor: Edwin Milanczak, Victoria Harbour (CA)

(73) Assignee: Canadian Shunt Industries Ltd., Markham (CA)

(*) Notice: Subject to any disclaimer, the term of this patent is extended or adjusted under 35 U.S.C. 154(b) by 330 days.

(21) Appl. No.: 09/789,918

(22) Filed: Feb. 21, 2001

(65) Prior Publication Data

US 2002/0114117 A1 Aug. 22, 2002

(51) Int. Cl.[7] .................................................. H02H 5/04
(52) U.S. Cl. ........................ 361/104; 439/621; 337/213
(58) Field of Search ................................ 361/103, 104, 361/91.1; 439/621, 622; 340/590, 638, 652; 337/142, 158, 159, 161, 162, 168, 181, 186–189, 194, 195, 201, 206, 208, 213, 215, 216, 221, 227, 228, 251–153, 260–266

(56) References Cited

U.S. PATENT DOCUMENTS

| | | | | |
|---|---|---|---|---|
| 3,056,870 A | * 10/1962 | Andres | 337/196 |
| 4,013,989 A | * 3/1977 | Born | 337/227 |
| 4,575,704 A | * 3/1986 | Pezold | 337/197 |
| D336,073 S | 6/1993 | Happ | D13/161 |
| D346,791 S | 5/1994 | Marach et al. | D13/160 |
| D348,048 S | 6/1994 | Marach et al. | D13/160 |
| 5,355,274 A | 10/1994 | Marach et al. | 361/104 |
| D355,642 S | 2/1995 | Marach et al. | D13/160 |
| D355,893 S | 2/1995 | Marach et al. | D13/160 |
| 5,963,411 A | * 10/1999 | Mollet et al. | 361/104 |
| 5,973,418 A | 10/1999 | Ciesielka et al. | 307/130 |
| 6,325,673 B1 | * 12/2001 | Mai | 439/622 |

OTHER PUBLICATIONS

Specification of Telpower High Current Switch; Cooper Bussman, Inc., No Date.

* cited by examiner

*Primary Examiner*—Ronald Leja
(74) *Attorney, Agent, or Firm*—Merchant & Gould, P.C.

(57) ABSTRACT

A fused electrical disconnect device includes a housing defining a cartridge receptacle. A line interface and a load interface are disposed within the receptacle. A line terminal extends into the body and is in electrical communication with the line interface. A load terminal also extends into the body and is in electrical communication with the load interface. A fuse holding cartridge is removably insertable into the cartridge receptacle and releasably accommodates a load protection fuse. The fuse holding cartridge establishes an electrical current path between the line and load interfaces when the fuse holding cartridge accommodates a load protection fuse and is inserted into the cartridge receptacle. An alarm signal circuit is also in electrical communication with the line and load terminals. The alarm signal circuit generates an alarm signal when the electrical current path is interrupted and the line and load terminals are electrically coupled to a power source and a load respectively.

46 Claims, 7 Drawing Sheets

FUSED ELECTRICAL DISCONNECT DEVICE FOR HIGH CURRENT APPLICATIONS

FIELD OF THE INVENTION

The present invention relates generally to low voltage, high current electrical power distribution systems, and more particularly to a fused electrical disconnect device for use in a low voltage, high current electrical power distribution system.

BACKGROUND OF THE INVENTION

Power distribution systems, such as telephone switching offices in telecommunications systems are often constructed on a large scale to serve many customers. Since telephone communications are essential for most businesses, it is necessary to ensure that telecommunications systems of this nature are highly reliable. To keep telecommunications systems operational in the event of power interruptions, most telecommunications systems typically include a plurality of high-capacity storage batteries to provide electrical power for operating telecommunications equipment whenever power from the conventional power sources becomes unavailable.

In these telecommunications systems, batteries and power converters are usually connected together so that operating telecommunications equipment are supplied with power from a collection of sources. Notwithstanding this, it is desirable to be capable of isolating individual pieces of telecommunications equipment (or small groups thereof) from the power sources in order to perform maintenance and installation activities. It is also desirable to provide overload protection for telecommunications equipment on an individual basis.

In large telecommunications installations, power distribution is arrayed with larger fused electrical disconnect devices installed in power distribution panels distributing power to smaller fused electrical disconnect devices installed in power distribution panels. Until recently, large fused electrical disconnect devices used in these telecommunications installations typically had a maximum current rating of about 800 amps. However, newer telecommunications installations have extended maximum current ratings for larger fused electrical disconnect devices up to about 1200 amps.

The smaller fused electrical disconnect devices used in telecommunications installations are typically connected to a power distribution panel that interconnects a power source supply buss and the load telecommunications equipment and include replaceable load protection fuses that interrupt power when an overload or fault condition exists. When an overload or fault condition occurs and the load protection fuse in a fused electrical disconnect device blows, the load protection fuse must be removed from the fused electrical disconnect device and replaced before current flow to the telecommunications equipment can be resumed.

Since the power distribution panels are supplied with power from batteries and other low-impedance sources, extremely high currents in the range of from about 10,000 to 100,000 amps can occur in the event of an overload or fault condition. Installing fused electrical disconnect devices from the rear of the power distribution panels can therefore be highly dangerous since there is a possibility that a conductive tool or part may come into contact with the power distribution panels and cause a fault. As a result, fused electrical disconnect devices that are installed into the front of a power distribution panel are preferred.

Fused electrical disconnect devices that provide an alarm signal whenever the load protection fuses therein blow have been considered. An example of a fused electrical disconnect device of this nature is described in U.S. Pat. No. 5,355,274 to Marach et al. However, these fused electrical disconnect devices have been limited to low voltage, low current applications. Knowing when a load protection fuse blows anywhere in an arrayed power distribution system is important.

It is therefore an object of the present invention to provide a novel low voltage, high current, fused electrical disconnect device.

SUMMARY OF THE INVENTION

According to one aspect of the present invention there is provided a fused electrical disconnect device comprising:

- a housing defining a cartridge receptacle and including a line interface and a load interface within said receptacle;
- a line terminal extending into said body and being in electrical communication with said line interface;
- a load terminal extending into said body and being in electrical communication with said load interface;
- a fuse holding cartridge removably insertable into said cartridge receptacle and releasably accommodating a load protection fuse, said fuse holding cartridge establishing an electrical current path between said line and load interfaces when said fuse holding cartridge accommodates a load protection fuse and is inserted into said cartridge receptacle; and
- an alarm signal circuit in electrical communication with said line and load terminals, said alarm signal circuit generating an alarm signal when said electrical current path is interrupted and said line and load terminals are electrically coupled to a power source and load respectively.

Preferably, the alarm signal circuit also generates the alarm signal when the fuse holding cartridge is removed form the cartridge receptacle and the line and load terminals are electrically coupled to the power source and load respectively. In a preferred embodiment, the alarm signal circuit includes an alarm fuse in parallel with the load protection fuse. The alarm fuse electrically couples the line terminal to an alarm terminal when the load protection fuse fails to complete the electrical current path thereby to generate the alarm signal.

Preferably, the load protection fuse has a current rating in the range of from about 70 to 1200 amps. It is also preferred that the fuse holding cartridge includes a pair of resilient spring elements to engage the line and load interfaces thereby to retain the fuse holding cartridge in the cartridge receptacle.

According to another aspect of the present invention there is provided a low voltage, high current fused electrical disconnect device comprising:

- a housing defining a cartridge receptacle and including electrically conductive, laterally spaced line and load interfaces within said receptacle;
- generally cylindrical, laterally spaced line and load terminals extending from said housing, said line terminal being electrically coupled to said line interface and said load terminal being electrically coupled to said load interface;

- a fuse holding cartridge removably insertable into said receptacle and releasably accommodating a load protection fuse, said fuse holding cartridge establishing an electrical current path between said line and load interfaces when said fuse holding cartridge accommodates a load protection fuse and said fuse holding cartridge is inserted into said receptacle; and
- an alarm signal circuit in electrical communication with said line and load terminals, said alarm signal circuit generating an alarm signal when said electrical current path is interrupted and said line and load terminals are electrically coupled to a power source and load respectively.

The present invention provides advantages in that the fused electrical disconnect device generates an alarm signal whenever power to the load terminal is interrupted. Power interruption can be a result of a blown load protection fuse within the fused electrical disconnect device or the removal of the fuse holding cartridge from the fuse holding cartridge receptacle. Since the fused electrical disconnect provides an alarm signal when the fuse holding cartridge is removed from the fuse holding cartridge receptacle, situations where the fuse holding cartridge has been removed from the fuse holding cartridge receptacle but not replaced can be detected.

The present invention also provides advantages in that the fused electrical disconnect device is fully compatible with a range of class type fuses while maintaining a dimension similar to that of a conventional 600 amp fused electrical disconnect device.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
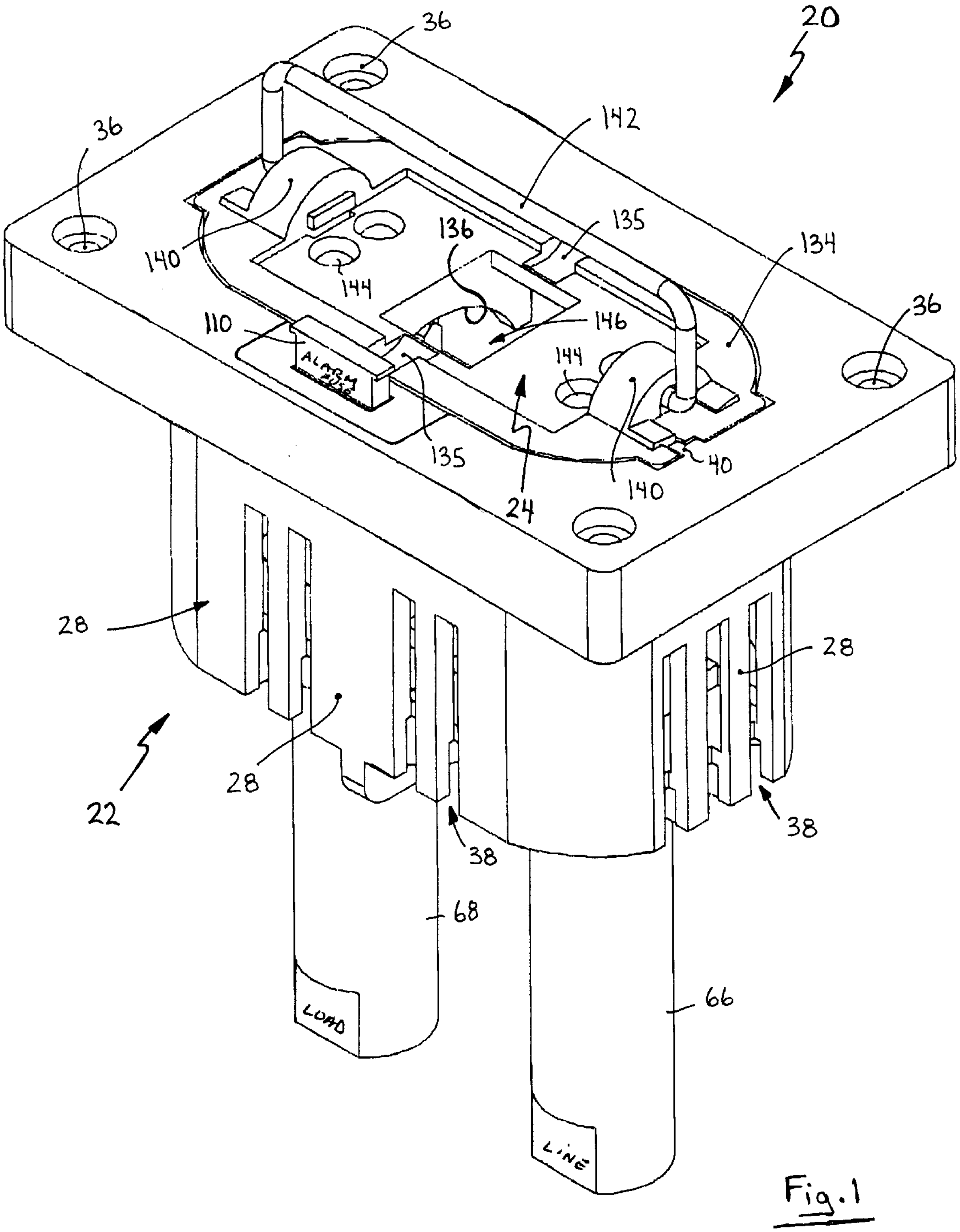
FIG. 1 is a perspective view of a fused electrical disconnect device in accordance with the present invention.

Referring now to FIG. 1, a low voltage, high current fused electrical disconnect device in accordance with the present invention is shown and is generally indicated to by reference numeral 20. Fused electrical disconnect device 20 is designed to be plugged into the front of a power distribution panel to interconnect a power source supply buss and a load. The fused electrical disconnect device provides a fused conductive path for high amperage current flowing between the power source supply buss and the load. If an overload or fault condition occurs and the current flowing through the fused electrical disconnect device exceeds its rating, current flow to the load is interrupted and an alarm signal, signifying the overload or fault condition is generated. Specifics of the fused electrical disconnect device 20 will now be described.

As can be seen, in this embodiment the fused electrical disconnect device 20 includes two main components, namely a fused electrical disconnect device housing 22 and a fuse holding cartridge 24 removably insertable into the housing 22.

Figure 5:
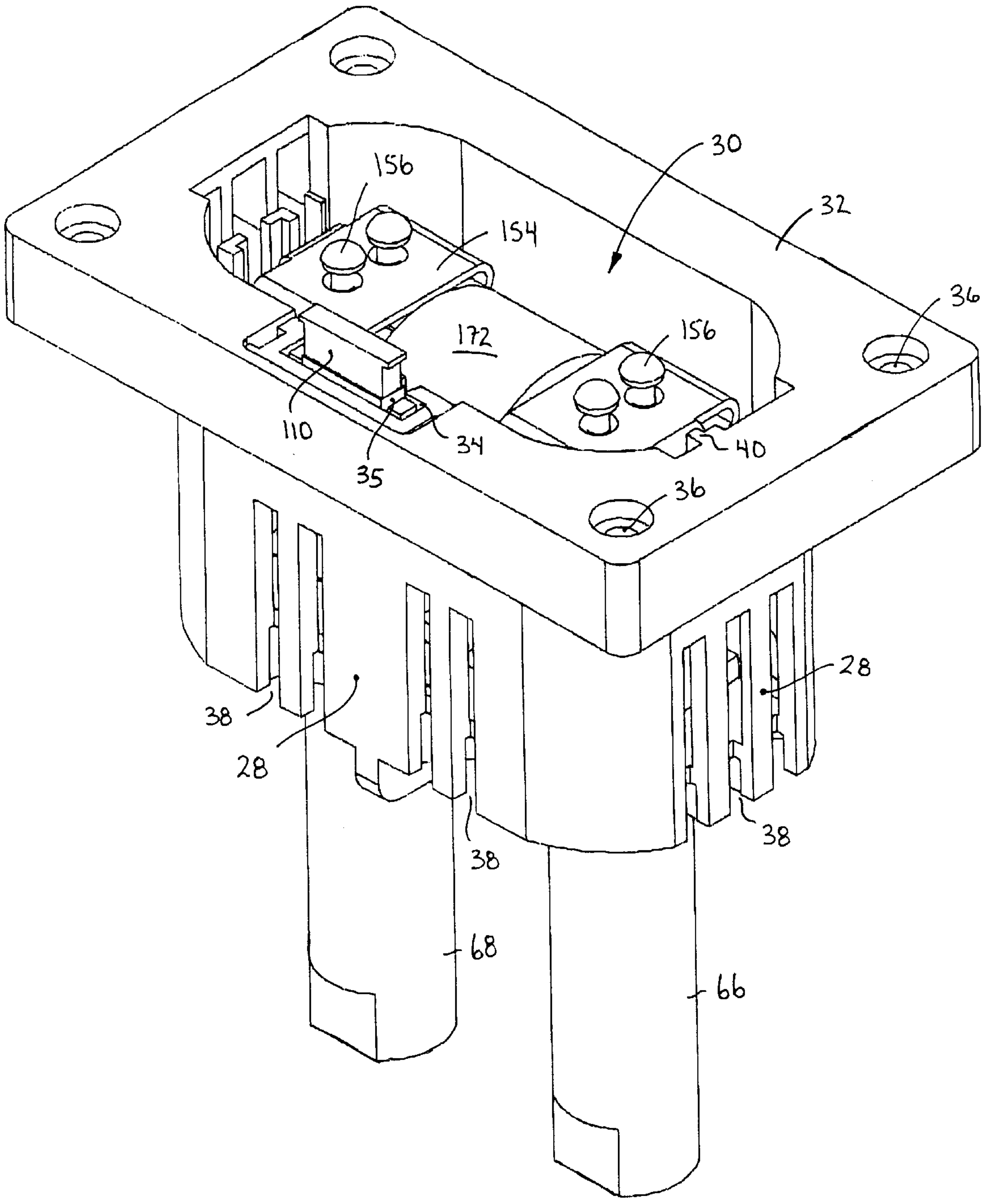
FIG. 5 is a perspective view of a portion of the fused electrical disconnect device of FIG. 1 showing the alarm signal circuit, the load and line terminals and an alarm fuse disposed within a housing.
Figure 6:
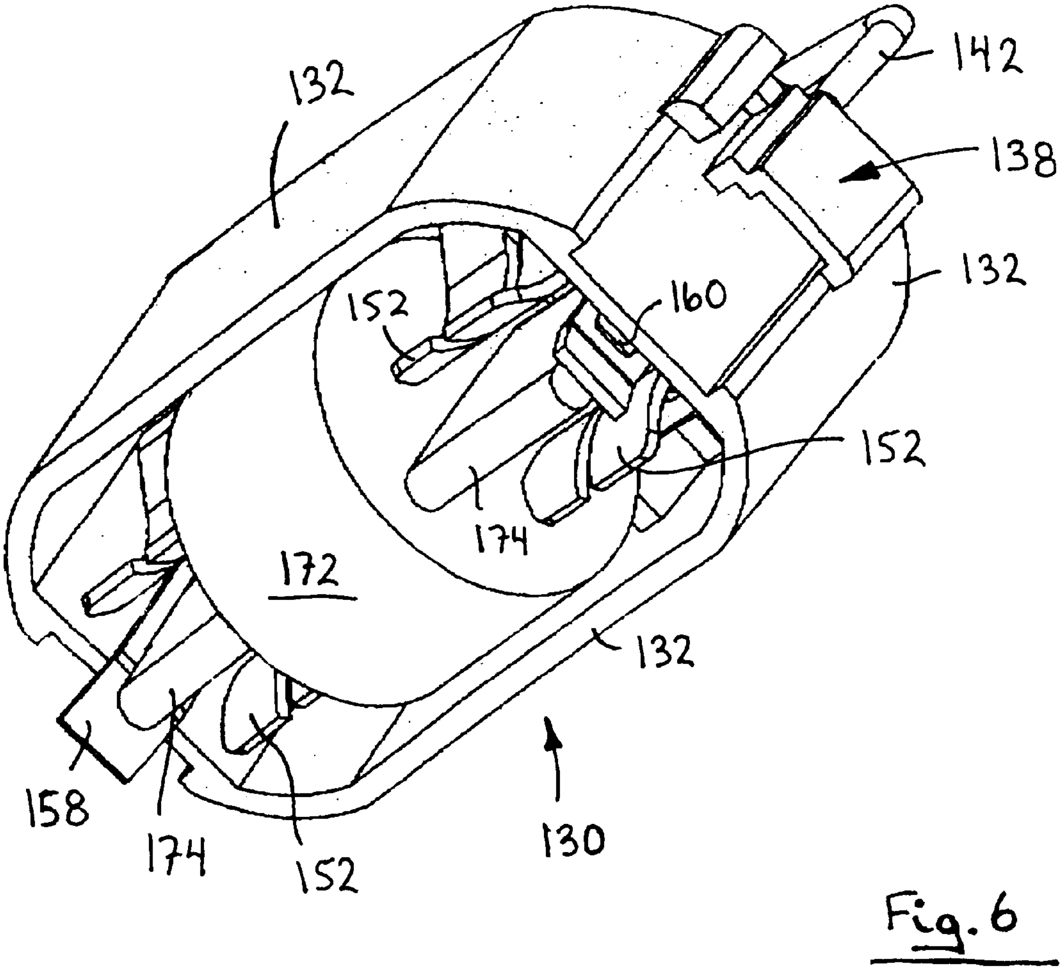
FIG. 6 is perspective view taken from below of a fuse holding cartridge forming part of the fused electrical disconnect device of FIG. 1.

Housing 22 is formed of plastic and includes a generally rectangular body 26 having side walls 28 defining a fuse holding cartridge receptacle 30 (see FIG. 5). A generally rectangular flange 32 is disposed on the body 26. A smaller alarm fuse receptacle 34 is provided in the flange 32 and is positioned at the midpoint of one of its major sides. The alarm fuse receptacle 34 accommodates an alarm fuse holder 35 (see FIG. 2). Holes 36 are provided adjacent the corners of the flange 32 and accommodate fasteners (not shown) to allow the housing 22 to be secured to the power distribution panel.

Ventilation slots 38 are provided in the side walls 28 of the body 26 to facilitate airflow and inhibit overheating within the housing 22. A formation 40 is formed on the interior of one of the side walls 28 and mates with a complimentary formation on the fuse holding cartridge 24 as will be described.

Figure 2:
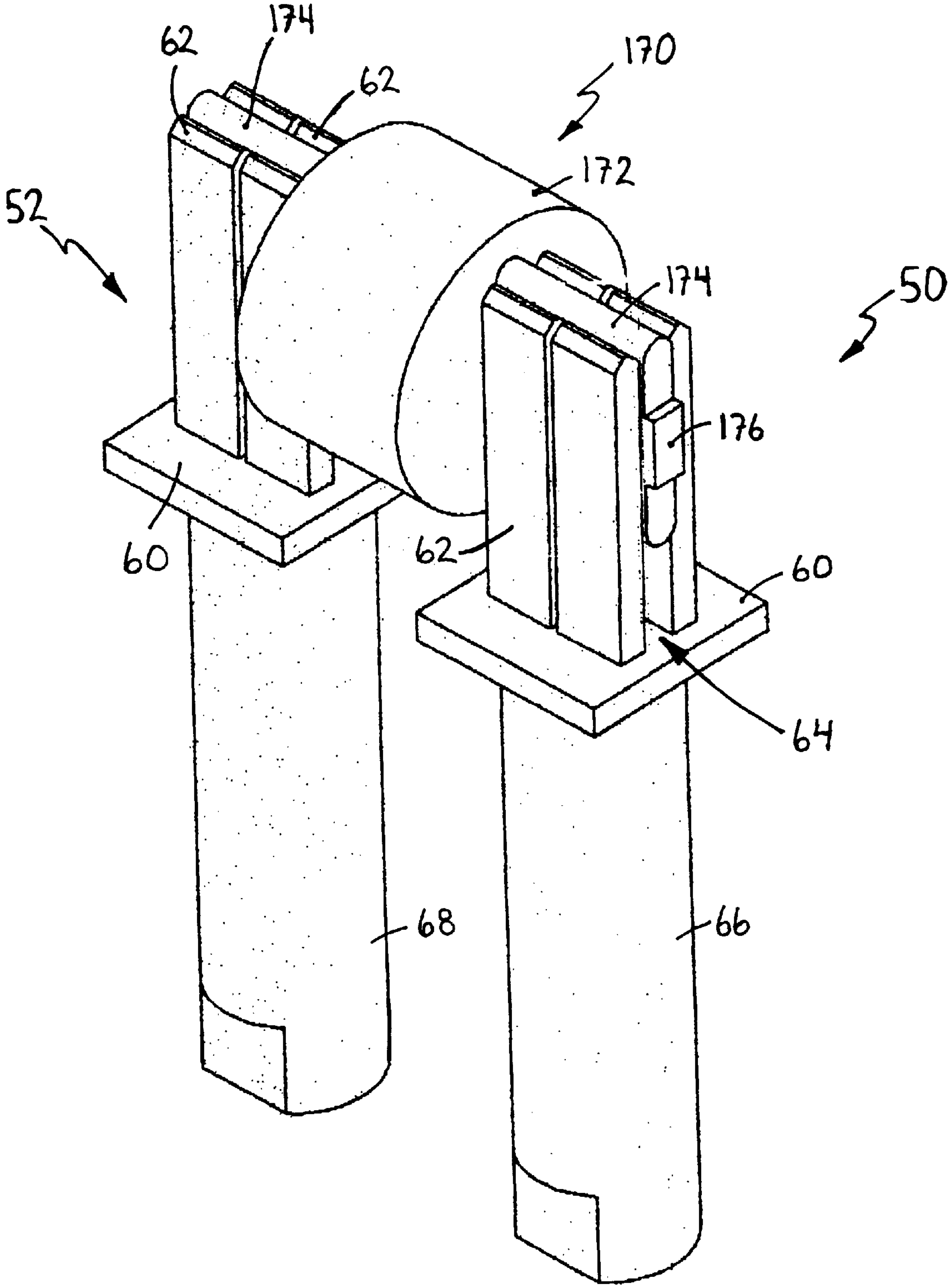
FIG. 2 is a perspective view of a portion of the fused electrical disconnect device of FIG. 1 showing a load protection fuse interconnecting load and line terminals.

Conductive line and load interfaces 50 and 52 respectively are secured to the body 26 within the fuse holding cartridge receptacle 30 by suitable fasteners (not shown) and are spaced to isolate them electrically (see FIG. 2). Each interface includes a base 60 and two side-by-side pairs of spaced blades 62 extending upwardly from one side of the base 60. The blades 62 of the interfaces 50 and 52 are aligned to define aligned slots 64. A generally cylindrical line terminal 66 is secured to the base 60 of line interface 50 and extends beyond the base of body 26. Similarly, a generally cylindrical load terminal 68 is secured to the base 60 of load interface 52 and extends beyond the base of body 26. The line and load terminals 66 and 68 are designed to be plugged into the front of the power distribution panel.

Figure 3:
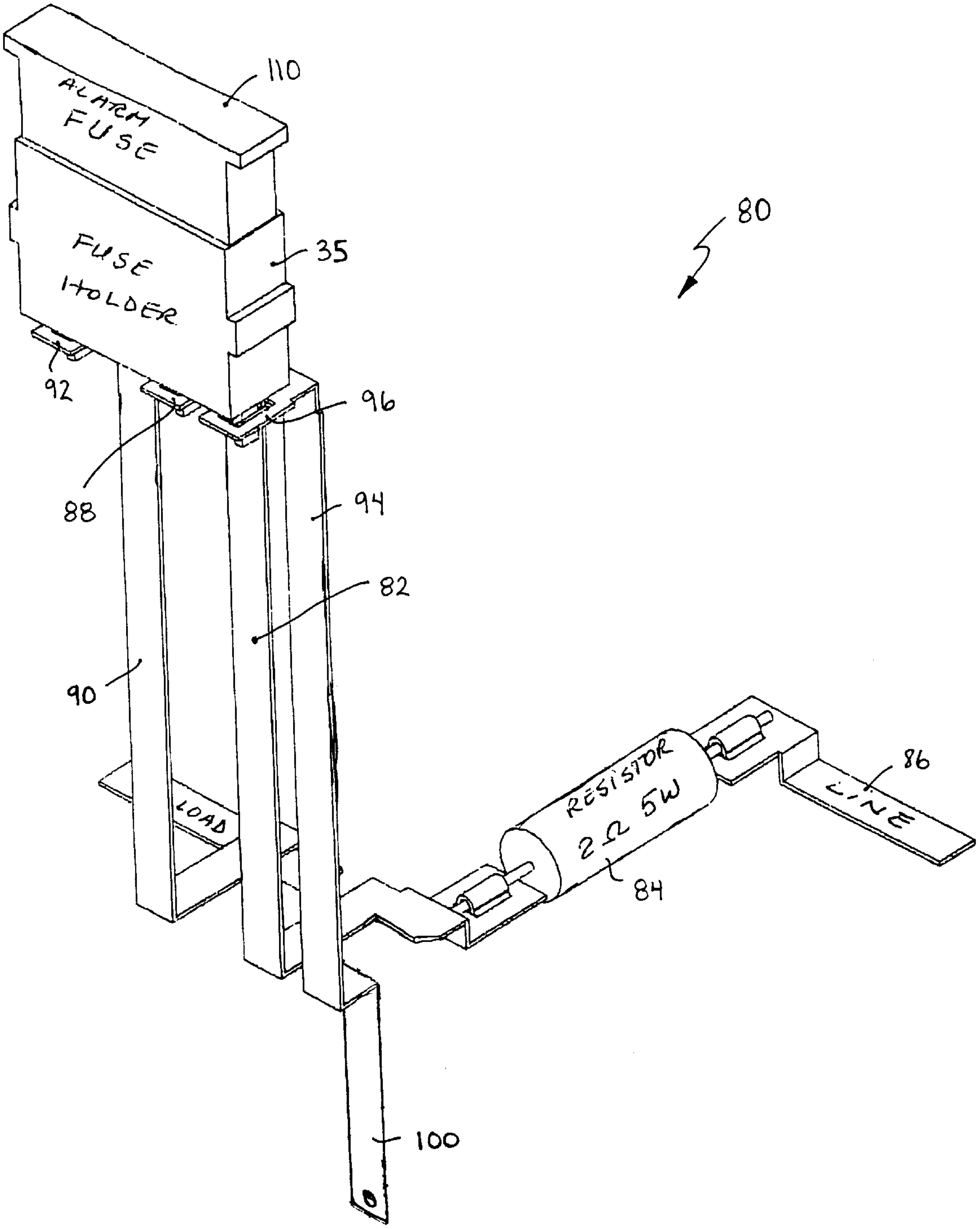
FIG. 3 is a perspective view of an alarm signal circuit forming part of the fused electrical disconnect device of FIG. 1.
Figure 4:
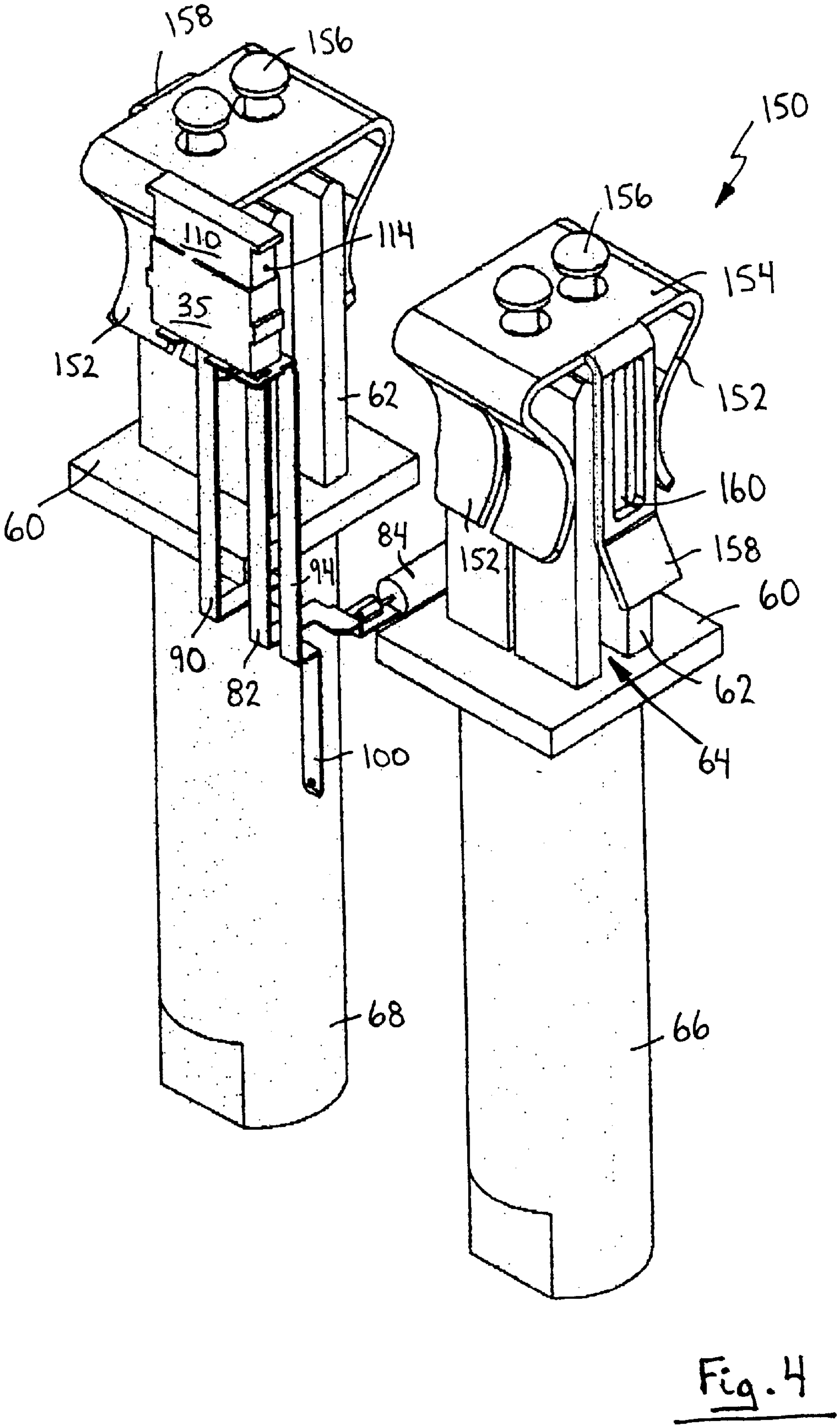
FIG. 4 is a perspective view of a portion of the fused electrical disconnect device of FIG. 1 showing the alarm signal circuit and the load and line terminals.

An alarm signal circuit 80 is also accommodated by the body 26 within the fuse holding cartridge receptacle 30 and is best illustrated in FIGS. 3 and 4. As can be seen, alarm signal circuit 80 includes a conductive element 82 having one end in electrical communication with one terminal of a current limiting resistor 84. The other terminal of current limiting resistor 84 is electrically coupled to the base 60 of the line interface 50 via a conductive element 86. The other end of conductive element 82 terminates at an alarm fuse contact 88. A second conductive element 90 has one end electrically coupled to the base 60 of the load interface 52. The other end of the conductive element 90 terminates at another alarm fuse contact 92. A third conductive element 94 has one end that terminates at yet another alarm fuse contact 96 and an opposite end that terminates at an alarm terminal 100. The alarm fuse contacts 88, 92 and 96 are positioned below the alarm fuse receptacle 34 and alarm fuse holder 35.

An alarm fuse 110 is removable insertable into the alarm fuse holder 35. When the alarm fuse 110 is inserted into the alarm fuse holder 35, the pins 112*a* to 112*c* of the alarm fuse engage the alarm fuse contacts 88, 92 and 96. The alarm fuse 110 is preferably of the type manufactured by San-O Industries Company and includes a plastic rectangular body 114 housing a fusible element 116 and a contact switch 118 (see FIG. 7). In its initial conducting state, pins 112*a* and 112*b* of the alarm fuse 110 are internally connected by the fusible element 116. In this manner, the alarm fuse 110 provides a current carrying path between the line interface 50 and the load interface 52.

Fuse holding cartridge 24 is best illustrated in FIGS. 1 and 4 to 6 and as can be seen, includes a body 130 having side walls 132 and a top 134 with an arcuate undersurface 136. One side of the body 130 has a formation 138 thereon that is shaped to receive the formation 40. This of course requires the fuse holding cartridge 24 to be properly oriented before it can be plugged into the fuse holding cartridge receptacle 30. Laterally spaced, arcuate handle mounts 140 are formed on the top 134. Each handle mount 140 receives an end of a handle 142 in a manner that permits rotation of the handle. Thus, handle 142 can be rotated between a forwardly extending position as shown in FIG. 1 where the handle can be easily grasped and retracted positions where the handle overlies the top 134. Recesses 135 are provided in the top 134 to facilitate grasping of the handle 142 when it is in one of the retracted positions. A pair of holes 144 is provided in the top 134 near each handle mount 140. A central opening 146 is also provided in the top 134 allowing a visual check of the interior of fuse holding cartridge 24 to be made.

Housed within the body 130 is a pair of load protection fuse retaining spring clips 150. Each clip 150 has a plurality of outwardly curved arms 152 that are joined by a generally flat bridge 154. Each arm is associated with one of the blades 62. A pair of rivets 156 extends from the bridge 154. The rivets 156 form snap fits with a respective pair of the holes 144 thereby to secure the clip 150 to the top 134 of the fuse holding cartridge 24. Each clip 150 also includes a fuse retainer 158 that extends from one side of the bridge 154. The retainer 158 has an elongate opening 160 therein and bends outwardly near its distal end.

A load protection fuse 170 having a cylindrical main fuse body 172 and a pair of terminals 174, each of which extends outwardly from an opposite side of the body 172, is removably received by the body 130. The load protection fuse 170 typically has a current rating in the range of from about 70 amps to 1200 amps depending on the installation. When the load protection fuse 170 is received by the body 130 of the fuse holding cartridge 24, the body 172 of the fuse 170 is accommodated by the arcuate undersurface 136 of the top 134. A rectangular projection 176 is formed on the end of each terminal 174. Each terminal 174 of the load protection fuse 170 passes between the curved arms 152 of a respective clip 150 with the end of each terminal contacting the retainer 158 of the clip 150 in a manner so that the projection 176 is accommodated by the opening 160.

When the fuse holding cartridge 24 holds a load protection fuse 170 and is inserted into the fuse holding cartridge receptacle 30, the terminals 174 of the load protection fuse are accommodated by the aligned slots 64 and contact the blades 62. The curved arms 152 contact the exterior surfaces of the blades 62. The resilient nature of the arms 152 securely holds the fuse holding cartridge 24 to the blades 62.

Figure 7:
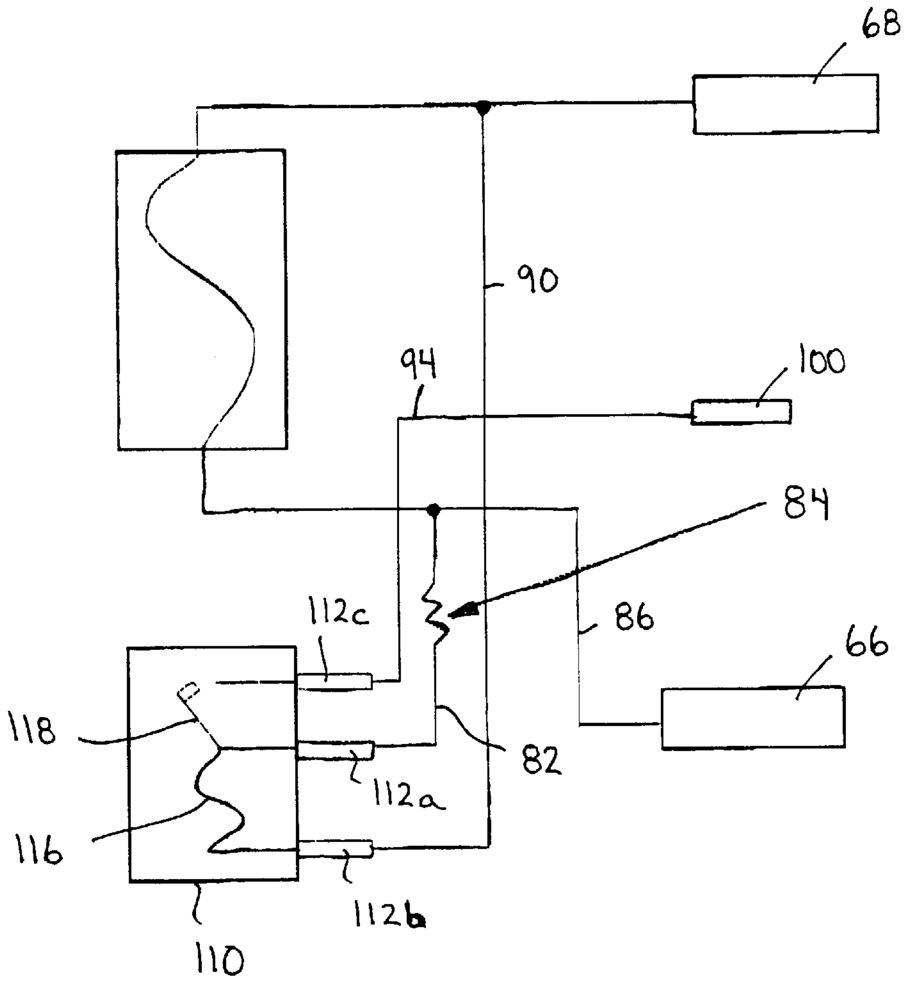
FIG. 7 is an electrical schematic of the fused electrical disconnect device of FIG. 1.

FIG. 7 shows an electrical schematic of the fused electrical disconnect device 20 with the fuse holding cartridge 24 holding a load protection fuse 170 and being plugged into the fuse holding cartridge receptacle 30 and with an alarm fuse 110 plugged into the alarm fuse holder 35 that is accommodated by the alarm fuse receptacle 34. As can be seen, the load protection fuse 170 completes an electrical current path between the line and load interfaces 50 and 52 respectively. The alarm fuse 110 is in parallel with the load protection fuse 170 and is electrically connected to the line interface 50 via the current limiting resistor 84 and the load interface 52 via conductor 90.

In typical operation, the fused electrical disconnect device 20 is plugged into the power distribution panel so that load terminal 68 is connected to a non-faulty load and the line terminal 66 is connected to the power source supply buss. Assuming that the load protection fuse 170 and the alarm fuse 110 are in their initial conducting states, current flows between the line and load terminals 66 and 68 via the line and load interfaces 50 and 52 and the load protection fuse 170. Although the alarm fuse 110 is also connected across the line and load interfaces 50 and 52, in parallel with the load protection fuse 170, the alarm fuse 110 remains intact due to the fact that only a small portion of the current flows through the alarm fuse 110.

If a fault or overload condition occurs on the load side, current above the rating of the load protection fuse flows through the load protection fuse 170 causing the load protection fuse 170 to interrupt current flow between the line and load terminals 66 and 68 respectively. Since the alarm fuse 110 is connected in parallel with the load protection fuse 170, when the current flow through the load protection fuse 170 is interrupted, the entire load current flows through the alarm fuse 110 via the current limiting resistor 84. Because the alarm fuse has a relatively low current carrying capacity, the fusible element 116 in the alarm fuse 110 melts or breaks virtually immediately in response to the significant increase in current. This results in the line terminal 66 becoming electrically isolated from the load terminal 68. When the fusible element 116 breaks or melts, pins 112*a* and 112*c* become internally connected by contact switch 118. As a result, the alarm fuse 110 electrically connects the alarm terminal 100 to the line terminal 66 via the conductive elements 86, 82 and 94 and the current limiting resistor 84. This provides an alarm signal on the alarm terminal 100. The alarm terminal 100 may of course be connected to a suitable remote monitoring or indication device thereby to allow the overload condition to be remotely detected.

Should a blown load protection fuse condition exist, the fuse holding cartridge 24 can be easily removed from the housing 22 by grasping the handle 142 and pulling the fuse holding cartridge 24 out of the fuse holding cartridge receptacle 30. Once the fuse holding cartridge 24 has been removed, the spent load protection fuse 170 and the spent alarm fuse 110 can be replaced with new fuses. Specifically, a new load protection fuse 170 is inserted into the body 130 of the fuse holding cartridge 24 after the spent load protection fuse has been removed and the fuse holding cartridge 24 is re-inserted into the housing 22 thereby to restore the electrical connection between the line and load terminals 66 and 68. The spent alarm fuse 110 is then replaced with a new alarm fuse.

If the fuse holding cartridge 24 is removed from the housing while the load protection fuse 170 is providing current flow between the line and load terminals 66 and 68 via the line and load interfaces 50 and 52, the entire load current again flows through the alarm fuse 110 via the current limiting resistor 84. This results in the fusible element 116 in the alarm fuse 110 melting or breaking virtually immediately. When this occurs, pins 112*a* and 112*c* of the alarm fuse 110 become internally connected by the contact switch 118. As a result, the alarm fuse 110 electrically connects the alarm terminal 100 to the line terminal 66 via the conductive elements 86, 82 and 94 and the current limiting resistor 84. This provides an alarm signal on the alarm terminal 100.

As will be appreciated, the fused electrical disconnect device provides a high amperage fuse holder that is fully compatible with a range of class type fuses while maintaining a dimension similar to that of a conventional 600 amp fuse holder. The fused electrical disconnect device also provides an alarm signal when a blown or missing load protection fuse condition exists.

Although a preferred embodiment of the present invention has been described, those of skill in the art will appreciate that variations and modifications may be made without departing from the spirit and scope thereof as defined by the appended claims.

I claim:

1. A fused electrical disconnect device comprising:

a housing defining a cartridge receptacle and including a line interface and a load interface within said receptacle;

a line terminal extending into said body and being in electrical communication with said line interface;

a load terminal extending into said body and being in electrical communication with said load interface;

a fuse holding cartridge removably insertable into said cartridge receptacle and releasably accommodating a load protection fuse, said fuse holding cartridge establishing an electrical current path between said line and load interfaces when said fuse holding cartridge accommodates a load protection fuse and is inserted into said cartridge receptacle, said fuse holding cartridge comprising a pair of resilient spring elements to engage said line and load interfaces thereby to retain said fuse holding cartridge in said cartridge receptacle; and an alarm signal circuit in electrical communication with said line and load terminals, said alarm signal circuit generating an alarm signal when said electrical current path is interrupted and said line and load terminals are electrically coupled to a power source and load respectively.

2. A fused electrical disconnect device as defined in claim 1 wherein said alarm signal circuit also generates said alarm signal when said fuse holding cartridge is removed from said cartridge receptacle and said line and load terminals are electrically coupled to said power source and load respectively.

3. A fused electrical disconnect device as defined in claim 2 wherein said alarm signal circuit includes an alarm fuse in parallel with said load protection fuse, said alarm fuse electrically coupling said line terminal to an alarm terminal when said load protection fuse fails to complete said electrical current path thereby to generate said alarm signal.

4. A fused electrical disconnect device as defined in claim 3 wherein said load protection fuse has a current rating in the range of from about 70 to 1200 amps.

5. A low voltage, high current fused electrical disconnect device comprising:

a housing defining a cartridge receptacle and including electrically conductive, laterally spaced line and load interfaces within said receptacle;

generally cylindrical, laterally spaced line and load terminals extending from said housing, said line terminal being electrically coupled to said line interface and said load terminal being electrically coupled to said load interface;

a fuse holding cartridge removably insertable into said receptacle and releasably accommodating a load protection fuse, said fuse holding cartridge establishing an electrical current path between said line and load interfaces when said fuse holding cartridge accommodates a load protection fuse and said fuse holding cartridge is inserted into said receptacle, said fuse holding cartridge comprising a pair of resilient spring elements to engage said line and load interfaces thereby to retain said fuse holding cartridge in said cartridge receptacle; and an alarm signal circuit in electrical communication with said line and load terminals, said alarm signal circuit generating an alarm signal when said electrical current path is interrupted and said line and load terminals are electrically coupled to a power source and load respectively.

6. A fused electrical disconnect device as defined in claim 5 wherein said device is dimensioned similar to a conventional fused electrical disconnect device that does not include an alarm signal circuit.

7. A fused electrical disconnect device as defined in claim 6 wherein said alarm signal circuit includes an alarm fuse in parallel with said load protection fuse, said alarm fuse electrically coupling said line terminal to an alarm terminal when said load protection fuse fails to complete said electrical current path thereby to generate said alarm signal.

8. A fused electrical disconnect device as defined in claim 7 wherein said housing includes side walls defining said receptacle and a peripheral flange on the side walls, said flange having an alarm fuse receptacle therein to receive removably said alarm fuse.

9. A fused electrical disconnect device as defined in claim 8 wherein said alarm signal circuit includes a first conductive element extending between said load interface and a first alarm fuse contact, a second conductive element extending between said line interface and a second alarm fuse contact, and a third conductive element extending between said alarm terminal and a third alarm fuse contact, said alarm fuse engaging said first, second and third alarm fuse contacts and interconnecting said first and second alarm fuse contacts in an initial conducting state and interconnecting said second and third alarm fuse contacts in an overload or fault condition.

10. A fused electrical disconnect device as defined in claim 9 wherein said second conductive element includes a current limiting resistor disposed between said line interface and said second alarm fuse contact.

11. A fused electrical disconnect device as defined in claim 9 wherein said alarm signal circuit also generates said alarm signal when said fuse holding cartridge is removed from said cartridge receptacle.

12. A fused electrical disconnect device as defined in claim 11 wherein said load protection fuse has a current rating in the range of from about 70 to 1200 amps.

13. A fused electrical disconnect device comprising:

a housing defining a cartridge receptacle and including a line interface and a load interface within said receptacle;

a line terminal extending into said body and being in electrical communication with said line interface;

a load terminal extending into said body and being in electrical communication with said load interface;

a fuse holding cartridge removably insertable into said cartridge receptacle and releasably accommodating a load protection fuse, said fuse holding cartridge establishing an electrical current path between said line and load interfaces when said fuse holding cartridge accommodates a load protection fuse and is inserted into said cartridge receptacle, said fuse holding cartridge comprising a biased retaining mechanism to maintain said fuse holding cartridge in secure contact with said line and load interfaces; and an alarm signal circuit in electrical communication with said line and load terminals, said alarm signal circuit generating an alarm signal when said electrical current path is interrupted and said line and load terminals are electrically coupled to a power source and load respectively.

14. A fused electrical disconnect device as defined in claim 13 wherein said biased retaining mechanism includes at least one spring clip.

15. A fused electrical disconnect device as defined in claim 14 wherein said biased retaining mechanism includes a pair of spaced spring clips, said spring clips engaging said line and load interfaces.

16. A fused electrical disconnect device as defined in claim 15 wherein each spring clip has a pair of curved arms with each arm of said pair curving in an opposite direction, said line and load interfaces when accommodated between the arms of said spring clips, separating said arms against a bias resulting in said arms being urged towards one another into secure and intimate contact with said line and load interfaces.

17. A fused electrical disconnect device as defined in claim 15 wherein said alarm signal circuit also generates said alarm signal when said fuse holding cartridge is removed from said cartridge receptacle and said line and load terminals are electrically coupled to said power source and load respectively.

18. A fused electrical disconnect device as defined in claim 17 wherein said alarm signal circuit includes an alarm fuse in parallel with said load protection fuse, said alarm fuse electrically coupling said line terminal to an alarm terminal when said load protection fuse fails to complete said electrical current path thereby to generate said alarm signal.

19. A fused electrical disconnect device as defined in claim 18 wherein said housing includes side walls defining said receptacle and a peripheral flange on the side walls, said flange having an alarm fuse receptacle therein to receive removably said alarm fuse.

20. A fused electrical disconnect device as defined in claim 19 wherein said alarm signal circuit includes a first conductive element extending between said load interface and a first alarm fuse contact, a second conductive element extending between said line interface and a second alarm fuse contact, and a third conductive element extending between said alarm terminal and a third alarm fuse contact, said alarm fuse engaging said first, second and third alarm fuse contacts and interconnecting said first and second alarm fuse contacts in an initial conducting state and interconnecting said second and third alarm fuse contacts in an overload or fault condition.

21. A fused electrical disconnect device as defined in claim 20 wherein said second conductive element includes a current limiting resistor disposed between said line interface and said second alarm fuse contact.

22. A fused electrical disconnect device as defined in claim 21 wherein said load protection fuse has a current rating in the range of from about 70 to 1200 amps.

23. A fused electrical disconnect device as defined in claim 18 wherein terminals of said load protection fuse are accommodated by said spring clips.

24. A fused electrical disconnect device as defined in claim 23 wherein each of said line and load interfaces includes at least one pair of spaced blades, the terminals of said load protection fuse being accommodated between the pairs of spaced blades, said spring clips contacting outer surfaces of the spaced blades.

25. A fused electrical disconnect device as defined in claim 24 wherein each spring clip has a pair of curved arms with each arm of said pair curving in an opposite direction, said line and load interfaces when accommodated between the arms of said spring clips, separating said arms against a bias resulting in said arms being urged towards one another into secure and intimate contact with said line and load interfaces.

26. A low voltage, high current fused electrical disconnect device comprising:

a housing having an upper surface and defining a cartridge receptacle and including electrically conductive, laterally spaced line and load interfaces within said receptacle;

laterally spaced line and load terminals extending from said housing, said line terminal being electrically coupled to said line interface and said load terminal being electrically coupled to said load interface;

a fuse holding cartridge removably insertable into said receptacle and releasably accommodating a load protection fuse, said fuse holding cartridge being flush with said upper surface and establishing an electrical current path between said line and load interfaces when said fuse holding cartridge accommodates a load protection fuse and is inserted into said receptacle, said fuse holding cartridge including bias clips to engage said line and load interfaces, thereby to retain said fuse holding cartridge in said cartridge receptacle; and an alarm signal circuit in electrical communication with said line and load terminals, said alarm signal circuit generating an alarm signal when said electrical current path is interrupted and said line and load terminals are electrically coupled to a power source and load respectively.

27. A fused electrical disconnect device as defined in claim 26 wherein said alarm signal circuit also generates said alarm signal when said fuse holding cartridge is removed from said cartridge receptacle and said line and load terminals are electrically coupled to said power source and load respectively.

28. A fused electrical disconnect device as defined in claim 27 wherein said alarm signal circuit includes an alarm fuse in parallel with said load protection fuse, said alarm fuse electrically coupling said line terminal to an alarm terminal when said load protection fuse fails to complete said electrical current path thereby to generate said alarm signal.

29. A fused electrical disconnect device as defined in claim 28 wherein said load protection fuse has a current rating in the range of from about 70 to 1200 amps.

30. A fused electrical disconnect device as defined in claim 29 wherein said upper surface has an alarm fuse receptacle therein to receive removably said alarm fuse.

31. A fused electrical disconnect device as defined in claim 30 wherein said alarm signal circuit includes a first conductive element extending between said load interface and a first alarm fuse contact, a second conductive element extending between said line interface and a second alarm fuse contact, and a third conductive element extending between said alarm terminal and a third alarm fuse contact, said alarm fuse engaging said first, second and third alarm fuse contacts and interconnecting said first and second alarm fuse contacts in an initial conducting state and interconnecting said second and third alarm fuse contacts in an overload or fault condition.

32. A fused electrical disconnect device as defined in claim 31 wherein said second conductive element includes a current limiting resistor disposed between said line interface and said second alarm fuse contact.

33. A fused electrical disconnect comprising:

a housing comprising a fuse cartridge receptacle, a line side terminal extending from said receptacle and a load side terminal extending from said receptacle; and a retractable fuse cartridge comprising a body, a line side clip within said body, a load side clip within said body and a load protection fuse extending between said line side and load side clips, said line side terminal and line side clip and said load side terminal and load side clip being in secure biased contact when said fuse cartridge is inserted into said receptacle.

34. A fused electrical disconnect as defined in claim 33 wherein said line side and load side clips are resilient clips engaging outer surfaces of said line side and load side terminals.

35. A fused electrical disconnect device as defined in claim 34 wherein each clip has a pair of curved arms with each arm of said pair curving in an opposite direction, said line side and load side terminals when accommodated between the arms of said clips, separating said arms against a bias resulting in said arms being urged towards one another into secure and intimate contact with said line side and load side terminals.

36. A fused electrical disconnect device as defined in claim 35 wherein each of said line side and load side terminals includes at least one pair of spaced blades, the terminals of said load protection fuse being accommodated between the pairs of spaced blades, said clips contacting outer surfaces of the spaced blades.

37. A fused electrical disconnect as defined in claim 33 further comprises a retainer engaging said load protection fuse to retain said load protection fuse within said body.

38. A fused electrical disconnect as defined in claim 37 wherein said retainer engages a terminal of said load protection fuse.

39. A fused electrical disconnect as defined in claim 38 wherein said line side and load side clips are resilient clips engaging outer surfaces of said line side and load side terminals.

40. A fused electrical disconnect as defined in claim 39 wherein each clip carries a retainer engaging a terminal of said load protection fuse.

41. A fused electrical disconnect as define in claim 33 further comprising an alarm signal circuit in electrical communication with said line side and load side terminals, said alarm signal circuit generating an alarm signal when an electrical current path between said line side and load side terminals is interrupted when said line side and load side terminals are electrically coupled to a power source and load respectively.

42. A fused electrical disconnect device as defined in claim 41 wherein said alarm signal circuit also generates said alarm signal when said cartridge is removed from said receptacle and said line side and load side terminals are electrically coupled to said power source and load respectively.

43. A fused electrical disconnect device as defined in claim 42 wherein said alarm signal circuit includes an alarm fuse in parallel with said load protection fuse, said alarm fuse electrically coupling said line side terminal to an alarm terminal when said load protection fuse fails to complete said electrical current path thereby to generate said alarm signal.

44. A fused electrical disconnect device as defined in claim 43 wherein said load protection fuse has a current rating in the range of from about 70 to 1200 amps.

45. A fused electrical disconnect device as defined in claim 44 wherein said alarm signal circuit includes a first conductive element extending between said load side terminal and a first alarm fuse contact, a second conductive element extending between said line side terminal and a second alarm fuse contact, and a third conductive element extending between said alarm terminal and a third alarm fuse contact, said alarm fuse engaging said first, second and third alarm fuse contacts and interconnecting said first and second alarm fuse contacts in an initial conducting state and interconnecting said second and third alarm fuse contacts in an overload or fault condition.

46. A fused electrical disconnect device as defined in claim 45 wherein said second conductive element includes a current limiting resistor disposed between said line side terminal and said second alarm fuse contact.

* * * * *